(12) United States Patent
Kautz et al.

(10) Patent No.: US 6,609,620 B1
(45) Date of Patent: Aug. 26, 2003

(54) STORAGE RACK COLUMN PROTECTOR

(75) Inventors: Allen B. Kautz, Wheaton, IL (US); Robert D. Gruber, New Lenox, IL (US)

(73) Assignee: Interlake Material Handling, Inc., Naperville, IL (US)

( * ) Notice: Subject to any disclaimer, the term of this patent is extended or adjusted under 35 U.S.C. 154(b) by 0 days.

(21) Appl. No.: 10/049,006

(22) PCT Filed: Jul. 21, 2000

(86) PCT No.: PCT/US00/20089
§ 371 (c)(1),
(2), (4) Date: Feb. 5, 2002

(87) PCT Pub. No.: WO01/10750
PCT Pub. Date: Feb. 15, 2001

Related U.S. Application Data
(60) Provisional application No. 60/147,718, filed on Aug. 6, 1999.

(51) Int. Cl.[7] ............................................. A47B 96/00
(52) U.S. Cl. .................... 211/183; 211/191; 248/345.1
(58) Field of Search ................................ 211/183, 189, 211/191; 248/345.1, 551

(56) References Cited

U.S. PATENT DOCUMENTS

| | | | | |
|---|---|---|---|---|
| 3,671,003 A | * | 6/1972 | Henson | 296/167 |
| 4,088,229 A | * | 5/1978 | Jacoby et al. | 211/183 |
| 4,113,110 A | * | 9/1978 | Mittag | 211/183 |
| 5,167,395 A | * | 12/1992 | Pearman et al. | 248/551 |
| 5,369,925 A | * | 12/1994 | Vargo | 211/183 |
| 6,257,557 B1 | * | 7/2001 | Anderson et al. | 52/736.4 |

FOREIGN PATENT DOCUMENTS

| | | | | |
|---|---|---|---|---|
| DE | 3129864 | | 2/1983 | |
| DE | 3621816 | | 1/1988 | |
| FR | 2424982 A | * | 1/1980 | A47F/13/00 |

* cited by examiner

Primary Examiner—Daniel P. Stodola
Assistant Examiner—Erica B Harris
(74) Attorney, Agent, or Firm—Camoriano and Associates; Theresa Fritz Camoriano

(57) ABSTRACT

A storage rack column protector (30) is designed to protect a column (12) from damage from a straddle or outrigger type fork truck. If one of the outrigger forks is aimed at and heading toward the protected column (12), a ramp (36) on the protector raises the offending outrigger fork and thus also the wheel of the fork truck. Should the fork truck continue advancing, a stop (38) will bring the outrigger fork and the fork truck to a complete stop before it makes impact with the column.

10 Claims, 5 Drawing Sheets

STORAGE RACK COLUMN PROTECTOR

BACKGROUND OF THE INVENTION

This application claims priority from U.S. patent application Ser. No. 60/147,718, filed Aug. 6, 1999, which is hereby incorporated by reference. Since warehouse space for storage of goods is expensive, there are many advantages to an efficient and well organized vertical storage rack system which will allow the storage of goods in an orderly fashion. Since the products are stacked vertically, optimum use of the floor space may be achieved. The disadvantage is that the goods to be stored must be raised to the height of the rack where they are to be stored. The moving and especially the raising of the goods is most efficiently accomplished via fork trucks.

In as much as fork trucks require aisles to travel to the desired location to either store or retrieve goods from a particular rack, this aisle space is not available for storage. To maximize the storage area given a limited number of square feet in a building or warehouse, one must minimize the area reserved for aisle space for the fork trucks. Unfortunately, as one reduces the size of these aisles, the room to maneuver for the fork trucks is also reduced, and the end result is that the fork trucks hit the storage racks, damaging the fork trucks as well as the storage racks.

Counter-balanced fork trucks have a large counterbalancing weight on the back of the truck to compensate for the loads picked up by the forks of the truck. In some instances, in order to avoid all the extra load of the counterbalancing weights, and also to minimize the overall length of the fork trucks, fork trucks known as straddle or outrigger type trucks are used. The outrigger forks are nothing more than another pair of forks with wheels on them secured to the lower front of the forklift. These outrigger forks are not intended to raise and carry any loads. Instead, the outrigger forks ride along at ground level with the wheels contacting the floor. When a load is picked up by the fork truck, the outrigger forks press against the floor to counter the weight so as to keep the fork truck from tipping.

It is not unusual for these outrigger type fork trucks to hit and damage the base of storage racks around which they are operating. The operator is very preoccupied with the upper set of forks and where he is trying to place the goods on the rack, so he is not paying attention to the position of the outrigger forks. As he drives the truck closer to the rack in order to pick up or deliver a load of goods, he may drive one of the outrigger forks into a column, damaging the storage rack.

SUMMARY OF THE INVENTION

The column protector of this invention is intended to protect columns of a storage rack from accidental damage from fork trucks, and specifically from straddle or outrigger type fork trucks.

Each column protector wraps around the front of one of the columns of the rack and is secured to the floor. Each column protector stands guard in front of its respective column. The column protector includes a short ramp which has a front edge that lies very close to the floor level. The rear of the ramp preferably ends in a solid upright stop which is adjacent to the front of the column it protects. As a fork truck approaches the column, if the outrigger fork is aimed at the column, instead of hitting the column, the outrigger fork will ride up the slanting ramp and will pick up the wheel of the fork truck off the floor. If the truck is moving too fast, such that going up the ramp and picking up the wheel do not stop the truck, then the offending outrigger fork will hit the upright stop, and this will bring the truck to a stop before it has a chance to hit and damage the column.

The column protector of this invention preferably is manufactured from a single, thick piece of steel, which is cut and formed. The column protector is made of a much heavier gauge material than the column it is protecting.

DESCRIPTION OF THE PREFERRED EMBODIMENTS

Figure 1:
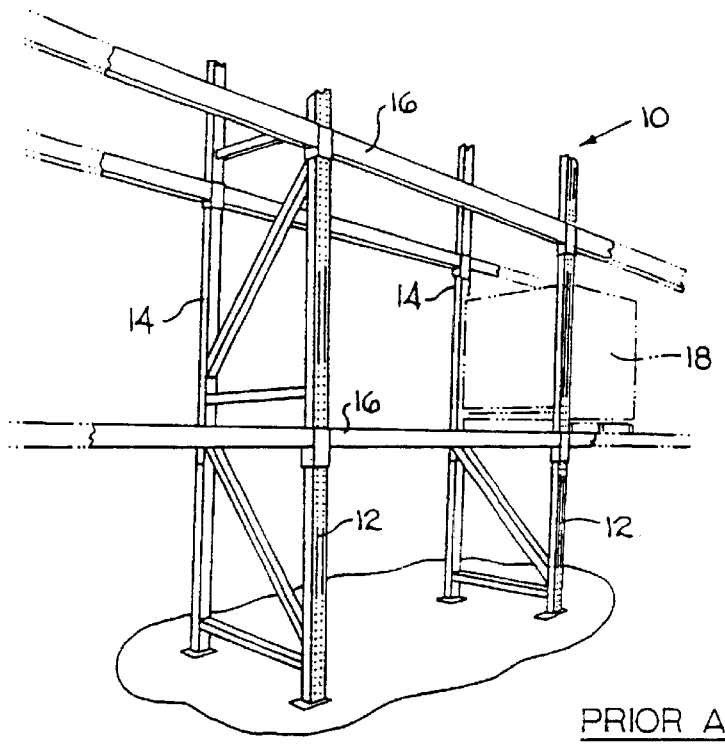
FIG. 1 is a broken-away perspective view of a rack on which the protector of the present invention is intended to be used.
Figure 2:
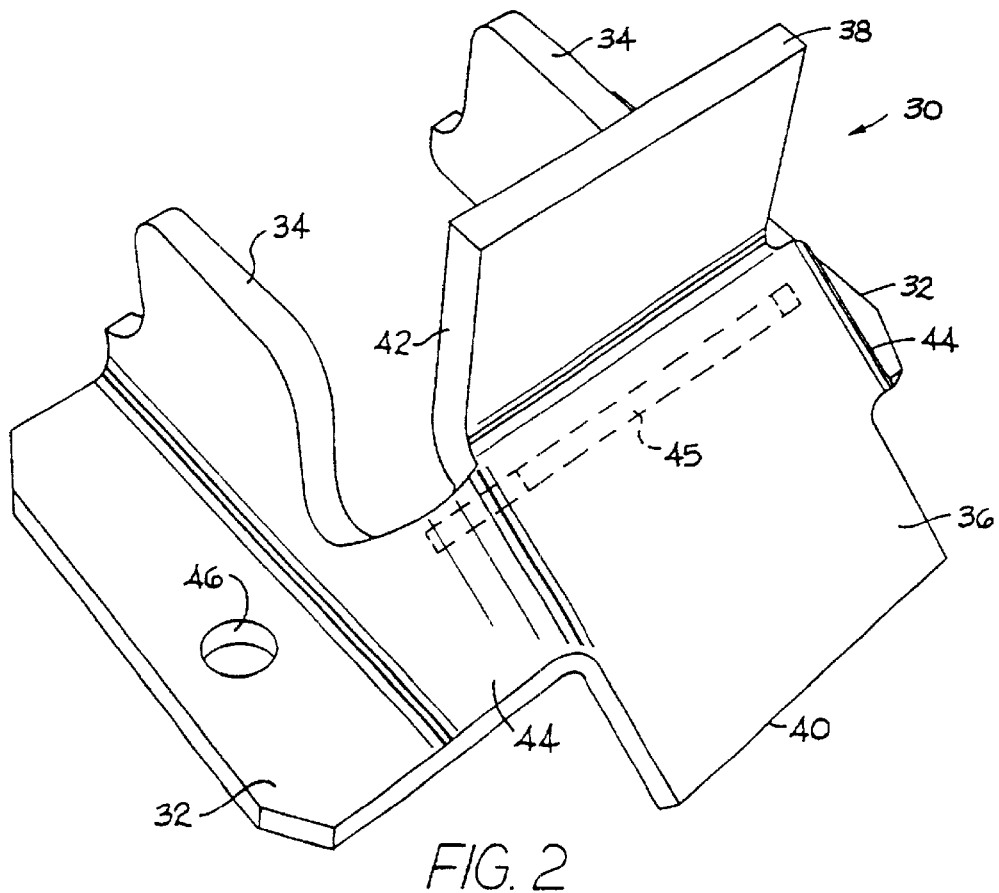
FIG. 2 is a front perspective view of a first embodiment of a column protector made in accordance with the present invention.
Figure 3:
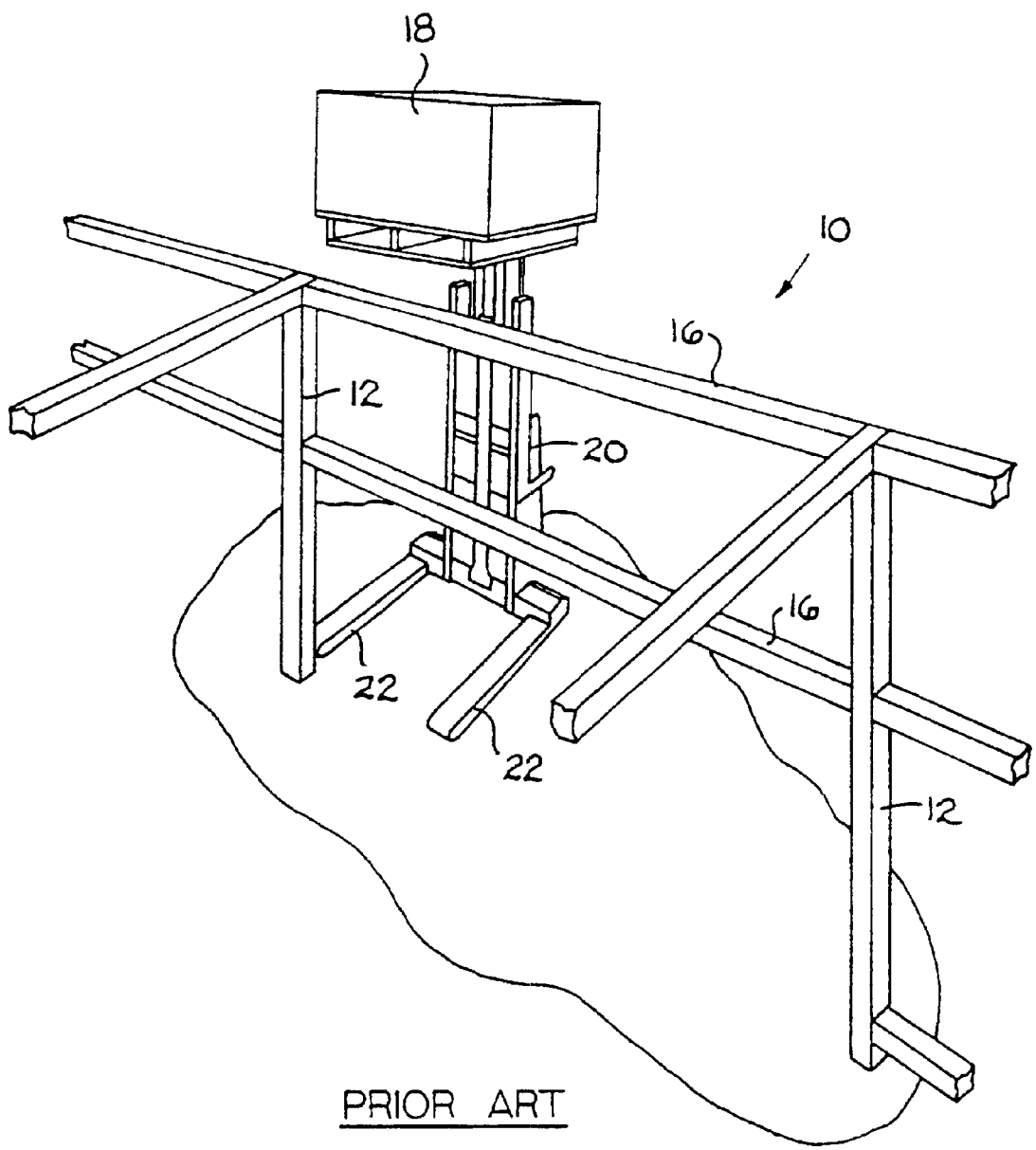
FIG. 3 is rear perspective view of a fork lift with outriggers loading a product onto the rack of FIG. 1.
Figure 4:
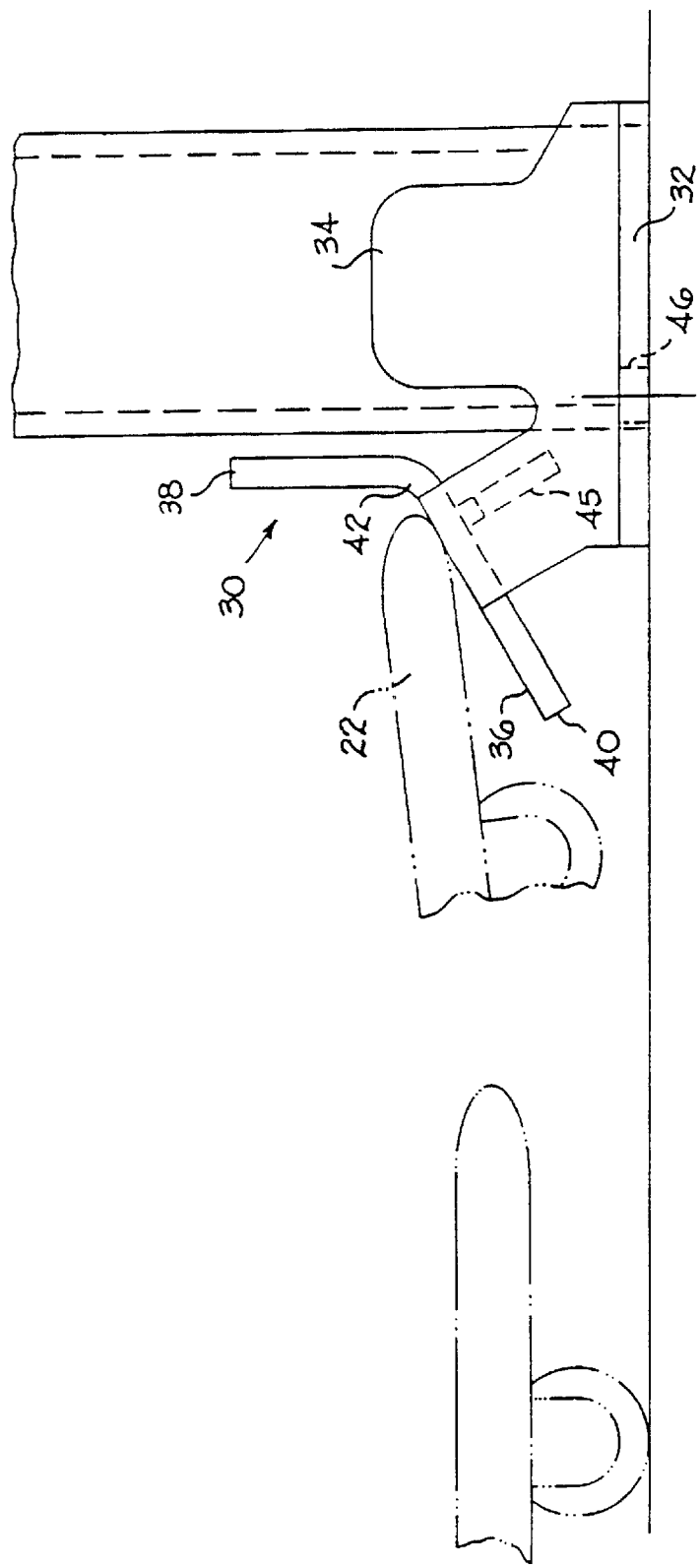
FIG. 4 is a side view of the column protector of FIG. 2 mounted on the rack of FIG. 3, with the forklift outrigger shown in phantom.
Figure 5:
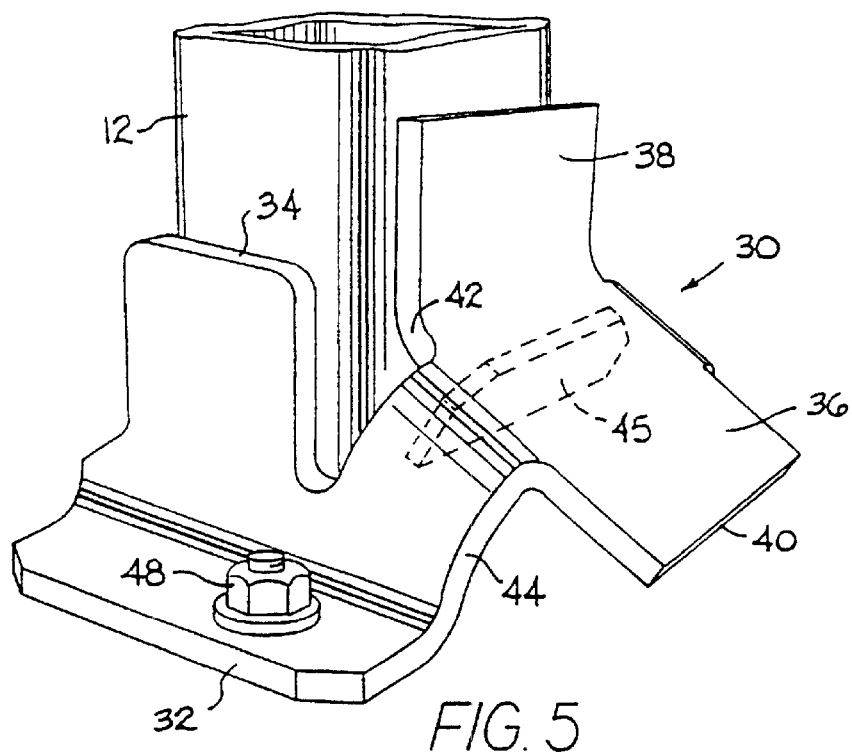
FIG. 5 is a left front perspective view of the column and column protector of FIG. 4.

FIG. 1 shows a rack 10, as is known in the prior art. The rack 10 includes a plurality of front vertical columns 12 and rear vertical columns 14, which are connected together by horizontal beams 16 to form shelves that support products 18. As shown in FIG. 3, the products 18 may be loaded onto and unloaded from the rack 10 using a forklift 20 having outriggers 22, which project forward from the forklift 20 just above ground level.

FIGS. 2, 4, 5, and 7–9 show a first embodiment of a column protector 30, made in accordance with the present invention, which may be mounted on the front of a column 12 to protect the rack 10 from being damaged by the outriggers 22. The column protector 30 is generally U-shaped, and wraps around the front and the left and right sides of the column 12. The column protector 30 includes the following main elements: left and right ears 32, left and right vertical projections 34, a front ramp 36, and a vertical wall or stop 38 projecting upwardly from the front ramp 36. The column protector 30 preferably is made from a single piece of flat steel, which is cut to form a blank, and is then formed into the final three dimensional finished piece. In this preferred embodiment, the steel from which the column protector 30 is formed is 5/16" thick. The column 12 itself is preferably made of a much lighter gauge steel, on the order of 0.070 to 0.120 inch thick.

The left and right ears 32 have flat bottom surfaces lying at the elevation of the floor or other flat surface to which they are mounted, and the columns 12 also have flat bottom surfaces at ground level. The ramp 36 lies at an angle so that its front edge 40 is slightly above ground level, and its rear edge 42 is at a higher elevation. The front vertical wall 38 projects upwardly from the rear edge 42 of the ramp 36. Left and right curved arms 44 connect the ramp 36 to the left and right ears 32, respectively, so that the ramp 36 lies between and projects forward of the ears 32.

The ears 32 have a top surface and a flat bottom surface and define substantially vertical holes 46 extending from the top surface through the flat bottom surface for bolting the ears down to the flat support surface. The interior surfaces of the ears 32, the vertical walls 34, and the upright stop 38 define a U-shaped recess, with the interior side surfaces of the U-shaped recess extending parallel to each other and parallel to the left and right sides of the rectangular cross-section column 12, which they protect. The front edge 40 of the ramp 36 is the forwardmost point on the column protector 30.

The column protector 30 is slid in from the front of the column 12, so that the front vertical wall 38 lies approximately one-half inch in front of the column 12, and the left and right vertical walls 34 lie adjacent to the left and right sides of the column 12, leaving a gap of approximately one-half inch between the left and right vertical walls 34 and the left and right sides of the column 12, respectively. Thus, the column protector 30 is effectively wrapped around the front and sides of the column 12 to protect them from the outriggers of the forklift. The ears 32 have holes 46, which receive fasteners that fasten them to the floor. In this case, the fasteners are concrete anchor bolts 48.

The left and right ears 32 are substantially parallel to each other. They are separated by a distance at least equal to the width of the column 12 and preferably allowing a one-half inch gap between the left and right vertical walls and the left and right sides of the column 12. The one-half inch space all around the column 12 allows for the slight bending of the column protector 30 without damage to the column 12. The column protector 30 may bend slightly upon impact, absorbing the energy of the truck 20 to protect the column 12.

An optional gusset 45 may be welded to the underside of the column protector 30, connecting and supporting the left and right curved arms 44 and the ramp 36.

In this preferred embodiment, the ramp 36 is a flat plate approximately 3" wide by 3" long and angles up at an angle a of approximately 30 degrees from the horizontal. The front and lower edge 40 of the ramp is approximately ½" above the bottom surface of the ears 32, which means that, when the protector is installed, the lower edge 40 of the ramp 36 portion is approximately ½" above the floor. The upper and rear 42 of the ramp smoothly transitions into the stop 38, which is a substantially vertical wall.

The stop 38 has a width equal to that of the ramp 36 (approximately 3") and a height of approximately 1.5".

During normal operation, a column protector 30 is installed at the base of every column 12 to be protected. The column protector 30 is placed such that its ears 32 straddle the sides of the column 12, the rear face of the stop 38 is one-half inch in front of the front of the column 12, and the front edge 40 of the ramp 36 is facing the direction from which the fork truck is likely to approach (in most instances this will be the aisle traveled by the fork truck). As the fork truck approaches the column, if the outrigger fork is aimed at the column, instead of hitting the column, the outrigger fork will ride up the slanting ramp 36. This action will pick the wheel of the fork truck off the floor. If the fork truck is moving too fast such that going up the ramp 36 and picking up the wheel do not stop the truck, then the offending outrigger fork will hit the upright stop 38, and this will bring the truck to a stop before it has a chance to hit and damage the column 12. The left and right vertical walls 34 also help protect the sides of the column 12 from the forks.

The impact of the fork truck will be transferred through the column protector 30 to the floor via the bolts 48 securing the column protector 30 to the floor. The direction in which the forces are applied to the bolts is substantially horizontal, while the bolts are mounted substantially vertically, so the force would have to shear the bolts in order to pull them loose, rather than tending to pull them out axially. The column itself will remain unscathed. In this manner, the column 12 of the storage rack need only be designed for the load carrying capacity it is expected to handle; the column 12 does not need to be beefed up in order to handle the potential fork truck abuse. Thus, the column 12 preferably is made of thinner-walled material than the column protector 30.

Figure 6:
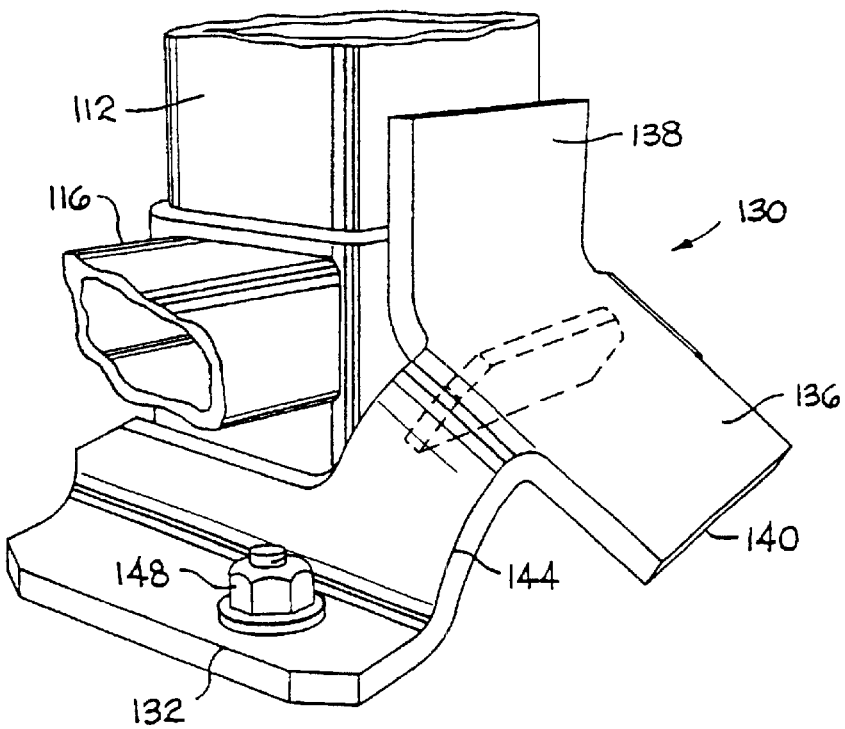
FIG. 6 is the same view as FIG. 5 but showing a second embodiment of a column and column protector.
Figure 7:
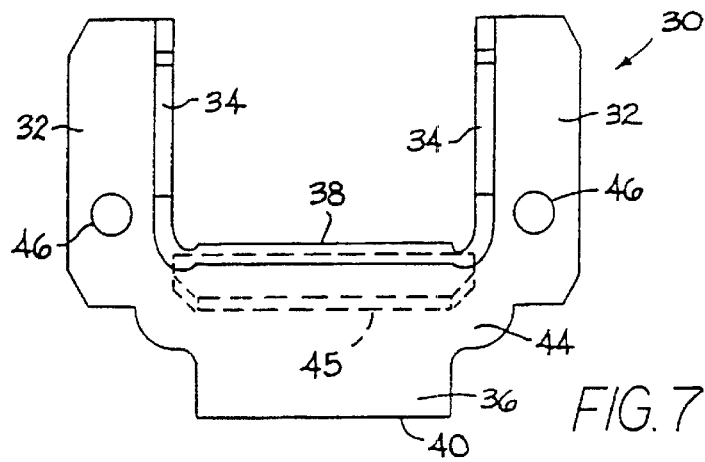
FIG. 7 is a top view of the column protector of FIG. 2.
Figures 8, 9:
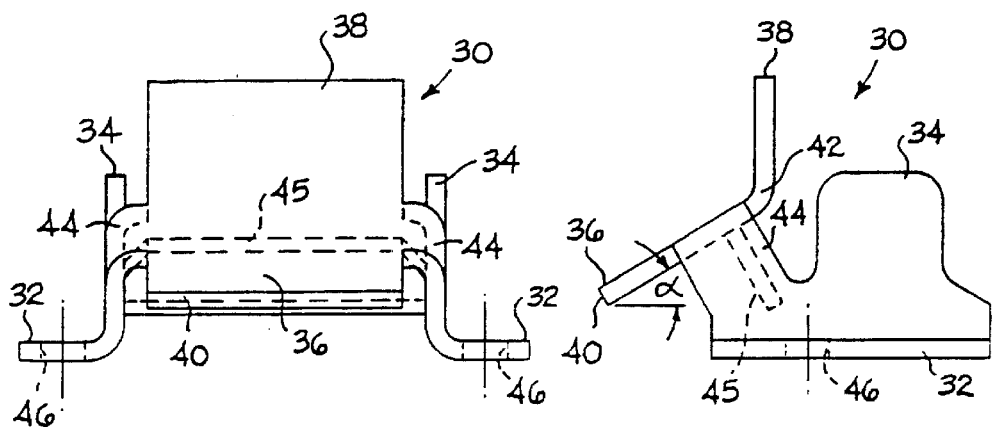
FIG. 8 is a front view of the column protector of FIG. 2.
FIG. 9 is a side view of the column protector of FIG. 2.
Figure 10:
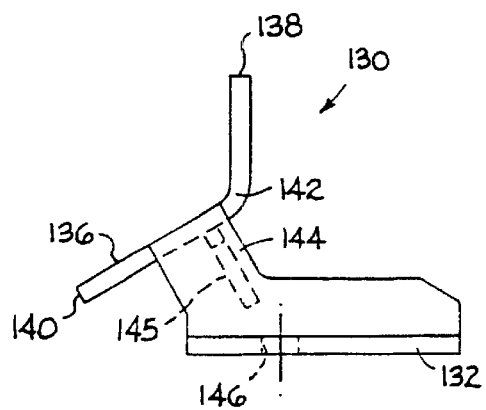
FIG. 10 is a side view of the column protector of FIG. 6.

FIGS. 6 and 10 show a second embodiment, which is the same as the first embodiment, except that the rack includes horizontal beams 116 which are close to the floor, so that they would interfere with the left and right vertical walls of the column protector. For that reason, the left and right vertical walls have been removed in this embodiment. However, the column protector 130 has all the other parts the same as the previous embodiment, including the ears 132, ramp 136, stop 138, front edge of the ramp 140, rear edge of the ramp 142, arms 144, gusset 145, holes (not shown) and bolts 148 extending through the holes.

It will be obvious to those skilled in the art that modifications may be made to the embodiments described above without departing from the scope of the present invention.

What is claimed is:

1. A column protector, comprising:
   a U-shaped body adapted to wrap around the front and sides of a column, including
   left and right ears having flat bottom surfaces at a first elevation and defining holes for bolting to a flat support surface;
   an intermediate forward ramp between said left and right ears, said intermediate forward ramp having a front edge lying close to said first elevation and extending upwardly and rearwardly to a rear edge at a second, higher elevation; and
   further comprising a substantially vertical wall projecting upwardly from the rear edge of said forward ramp.

2. A column protector, as recited in claim 1, and further comprising left and right vertical walls projecting upwardly from said left and right ears.

3. A column protector, comprising:
   a U-shaped body adapted to wrap around the front and sides of a column, including
   left and right ears having flat bottom surfaces at a first elevation and defining holes for bolting to a flat support surface; and
   an intermediate forward ramp between said left and right ears, said intermediate forward ramp having a front edge lying close to said first elevation, extending upwardly and rearwardly to a rear edge at a second, higher elevation;
   left and right vertical projections from said left and right ears, and
   a front vertical projection extending from the rear edge of said intermediate forward ramp.

4. A rack, comprising:
   a plurality of front vertical columns having flat bottom surfaces lying at a first elevation;

a plurality of rear vertical columns substantially parallel to said front vertical columns;

a plurality of horizontal beams interconnecting said vertical columns to form shelves for supporting products; and a plurality of column protectors, each including a U-shaped body wrapped around the front and sides of its respective front vertical column, each column protector including left and right ears having flat bottom ear surfaces at said first elevation and defining holes for bolting to a flat support surface;

an intermediate forward ramp between said left and right ears and in front of said front vertical column, said intermediate forward ramp having a front edge lying close to said first elevation and extending upwardly and rearwardly to a rear edge at a second, higher elevation; and a front upwardly projecting wall extending from the rear edge of said intermediate forward ramp and lying in front of its respective front vertical column.

5. A rack, as recited in claim 4, and further comprising left and right vertical walls projecting upwardly from said left and right ears and lying adjacent to the sides of said front vertical column.

6. A rack, as recited in claim 4, wherein said columns are made of a metal having a first thickness, and said column protectors are made of a metal having a substantially greater second thickness, so that said column protectors are stronger than said columns.

7. A column protector, comprising:

a U-shaped body having an interior surface defining a U-shaped recess, said interior surface including left and right interior side surfaces extending parallel to each other, said U-shaped recess being adapted to wrap around the front and sides of a rectangular cross-section column;

left and right ears on said U-shaped body, each of said ears having a top surface and a flat bottom surface at a first elevation and defining holes extending from said top surface through said bottom surface for bolting said ears down; and an intermediate forward ramp extending between and supported by said left and right ears, said intermediate forward ramp having a front edge lying close to said first elevation and extending upwardly and rearwardly to a rear edge at a second, higher elevation; and a forward vertical wall projecting upwardly from the rear edge of said forward ramp.

8. A column protector as recited in claim 2, and further comprising left and right vertical walls projecting upwardly from said left and right ears.

9. A column protector as recited in claim 8, wherein said front edge of said intermediate forward ramp defines the forwardmost point of said column protector.

10. A column protector as recited in claim 2, wherein said front edge of said intermediate forward ramp defines the forwardmost point of said column protector.

* * * * *

UNITED STATES PATENT AND TRADEMARK OFFICE
CERTIFICATE OF CORRECTION

PATENT NO. : 6,609,620 B1
DATED : August 26, 2003
INVENTOR(S) : Allen B. Kautz and Robert D. Gruber It is certified that error appears in the above-identified patent and that said Letters Patent is hereby corrected as shown below:

Column 3,
Line 43, delete "a" and insert therefor -- α --.

Column 6,
Line 21, delete "2" and insert therefor -- 7 --.
Line 24, delete "9" and insert therefor -- 7 --.
Line 27, delete "2" and insert therefor -- 8 --.

Signed and Sealed this

Sixteenth Day of December, 2003

JAMES E. ROGAN
*Director of the United States Patent and Trademark Office*